United States Patent [19]

Aleshin et al.

[11] 3,980,445

[45] Sept. 14, 1976

[54] METHOD OF MAKING FILTERING METAL MATERIAL

[76] Inventors: Vasily Alexeevich Aleshin, ulitsa Zorge, 52/1, kv. 25, Ufa; Galina Petrovna Bazarova, ulitsa, 54, korpus 1, kv. 43; Serafima Pavlovna Gromova, Izmailovsky bulvar, 58/13, kv. 27, both of Moscow; Jury Iosifovich Dmitriev, ulitsa Dostoevskogo, 40, korpus 13, kv. 11.; Jury Arkadievich Kuteminsky, ulitsa Parkovaya, 20, kv. 48, both of Ufa; Iza Ivanovna Komolova, 1 Dubrovskaya ulitsa, 13, kv. 39, Moscow; Georgy Olegovich Leschinsky, ulitsa Lyadova, 49/51, kv. 10; Vsevolod Konstantinovich Sorokin, ulitsa Kominterna, 174, kv. 19, both of Gorky; Galina Ivanovna Sazonova, ulitsa Volodarskogo, 45, kv. 11, Ufa; Alexandr Fedorovich Silaev, ulitsa Kransy Kazanets, 3, korpus 2, kv. 5, Moscow; Grigory Fedorovich Tikhonov, ulitsa Yablonevaya, 13-a, kv. 32; Valery Mikhailovich Schekin, ulitsa Zvezdina, 19-d, kv. 7, both of Gorky, all of U.S.S.R.

[22] Filed: July 3, 1974

[21] Appl. No.: 485,756

[52] U.S. Cl. ................................ 29/182; 75/221; 75/224; 75/222; 210/510
[51] Int. Cl.$^2$ .................... B22F 3/00; B22F 5/00; B01D 39/20; C22C 1/04
[58] Field of Search ............ 75/208, 221, 224, 222; 29/182; 210/496, 510

[56] References Cited
UNITED STATES PATENTS

| | | | |
|---|---|---|---|
| 2,721,378 | 10/1955 | Oliver et al. | 75/222 |
| 2,826,805 | 3/1958 | Probst et al. | 29/182 |
| 2,877,114 | 3/1959 | Fitzer | 75/222 |
| 2,946,681 | 7/1960 | Probst et al. | 75/222 |
| 3,142,892 | 8/1964 | Powell et al. | 29/182 |
| 3,331,684 | 7/1967 | Storchheim | 75/208 |
| 3,335,002 | 8/1967 | Clarke | 75/208 |
| 3,362,818 | 1/1968 | Schwarzkopf et al. | 75/222 |
| 3,577,226 | 5/1971 | Elbert et al. | 75/222 |

*Primary Examiner*—Brooks H. Hunt
*Attorney, Agent, or Firm*—Haseltine, Lake & Waters

[57] ABSTRACT

A method of making filtering material from powdered steel whereby said powdered steel is cold rolled into strip and the latter undergoes a two-stage sintering process.

The material produced by this method is intended for filtering fluids such as liquid fuel or brake fluid and is capable of retaining mechanical particles of the order of 2–3 microns.

2 Claims, No Drawings

METHOD OF MAKING FILTERING METAL MATERIAL

The present invention relates to methods of making filtering metal material intended for removing mechanical impurities from fluids, for example, liquid fuel or aircraft brake fluid.

It is known to use filtering media in the form of sintered metal netting, multilayer cellulose material impregnated with epoxy resin, filtering paper and synthetic fibre as well as glass, polyamide, polyester and acryl fibre.

The prior art suffers from the disadvantage that the materials mentioned above are only capable of retaining particles sized 15 to 10 microns.

Furthermore, paper filters have short service life and cannot be re-used after they have become clogged, whereas synthetic fibre filters are susceptible to heat and cannot be used in temperatures of the order of 250° – 300°C.

Inasmuch as contamination of the aforementioned fluids is likely to cause malfunctioning of the associated engine or mechanism, there arises need for providing novel filtering materials capable of fulfilling more stringent requirements.

At present there are no filtering materials capable of retaining particles sized 2 to 3 microns and withstanding temperatures of the order of 500° to 600°C.

Known in the art is a method of making porous filtering material whereby powdered stainless steel is rolled to a strip form, then sintered in two stages in a reducing atmosphere and thereafter cooled also in a reducing atmosphere.

This filtering material is made from austenitic stainless steel ground into spongy branched particles from 40 to 60 microns. The powdered steel is cold rolled into strip between mill rolls set with a gap of 0.13 to 0.15 mm and rotating at a speed of up to 2 revolutions per minute. The rolled strip is sintered in two stages. The first stage of sintering is carried out in a reducing atmosphere at a temperature of 870° to 930°C for 1 hour and is followed by cooling down to 100°C in a reducing atmosphere. The second stage of sintering is carried out at a temperature of 1240°C to 1260°C for 2 hours and is followed by slow cooling.

This method makes it possible to produce a filtering material capable of retaining particles sized 5 to 6 microns.

However, the requirements of filtering fineness in connection with the hydraulic systems of the present-day aircraft become more and more stringent since the functioning and service life of such hydraulic systems are largely dependant on the cleanliness of the hydraulic fluid employed therein.

Nowadays, the various hydraulic control systems of aircraft employ slidable mating parts arranged with clearances of the order of 1.5 to 5 microns. This necessitates that the hydraulic fluid employed in these systems be filtered through a medium having capillary passages one-half as small as the aforementioned clearances or at least narrower than the smallest clearance.

Moreover, such a filtering material should be highly permeable and also capable of retaining minute foreign particles and withstanding the effects of elevated temperatures.

It is an object of the present invention to provide a method of making metal material intended for filtering fluids and capable of retaining particles sized 2 to 3 microns.

It is another object of the present invention to ensure that the filtering material made by the method provided herein has an economically expedient filtering capacity.

It is still another object of the present invention to increase the strength of the filtering material made by the method provided herein.

These and other objects are achieved by providing a method of making filtering metal material whereby powdered austenitic stainless steel is rolled to a strip form and the strip so produced then undergoes a two-stage sintering process in a reducing atmosphere, each sintering stage being followed by cooling in a reducing atmosphere. According to the invention, steel ground into particles 10 to 30 microns is cold rolled between mill rolls spaced 0.08 to 0.12 mm apart and rotating at a speed of 2 to 4 revolutions per minute. The strip produced by rolling undergoes the first stage of the sintering process at a temperature of 820° to 880°C for 2 to 3 hours and thereafter is cooled down to 100°C. Then the second stage of sintering is carried out at a temperature of 1100° to 1150°C for 2 to 4 hours whereupon the material is cooled.

This method provides for obtaining filtering material capable of retaining particles of the order of 2 to 3 microns, said material featuring economically expedient filtering capacity and sufficient strength.

This method has been provided due to the use of a finer initial material, the latter being cold rolled with a reduced roll gap and at an increased roll speed, owing to which the material can be sintered at lowered temperatures.

Now examples will be set forth in order that the invention may be readily carried into effect.

EXAMPLE 1

Powdered stainless steel was screened to separate particles from 10 to 30 microns. This steel powder was rolled between mill rolls spaced 0.10 mm apart and rotating at a speed of 3 revolutions per minute. The strip produced by rolling was cut into sheets and the latter piled up, placed in a container and put in an electric furnace. The first stage of the sintering process was carried out in a reducing atmosphere at a temperature of 880°C for 2.5 hours and followed by cooling in a reducing atmosphere. Thereafter the sheet pile underwent the second stage of sintering in a reducing atmosphere at a temperature of 1150°C for 2 hours whereupon the material was cooled in a reducing atmosphere.

The filtering material produced by this method had through pores and was capable of retaining particles sized 2 microns, exhibiting the following properties: filtering capacity 0.006 l/cm²/min, tensile strength 13.5 kg/mm² (with a strip thickness of 0.15 mm), porosity 25 percent.

EXAMPLE 2

Powdered stainless steel was screened to separate particles from 10 to 30 microns. This steel powder was rolled between mill rolls spaced 0.08 mm apart and rotating at a speed of 2 revolutions per minute. The strip produced by rolling was cut into sheets 600 mm long and the latter piled up, placed in a container and put in an electric furnace. The first stage of the sintering process was carried out in a reducing atmosphere at a temperature of 820°C for 2 hours and followed by cooling in a reducing atmosphere. Thereafter the sheet pile underwent the second stage of sintering in a reducing atmosphere at a temperature of 1100°C for 4 hours whereupon the material was cooled in a reducing atmosphere.

The filtering material produced by this method had through pores and was capable of retaining particles sized 3 microns, exhibiting the following properties: filtering capacity 0.004 1/cm$^2$/min, tensile strength 11 kg/mm$^2$ (with a strip thickness of 0.17 mm), porosity 30 percent.

EXAMPLE 3

Powdered stainless steel was screened to separate particles from 10 to 30 microns. This steel powder was rolled between mill rolls spaced 0.12 mm apart and rotating at a speed of 4 revolutions per minute. The strip produced by rolling was cut into sheets and the latter placed in a container and put in an electric furnace. The first stage of the sintering process was carried out in a reducing atmosphere at a temperature of 860°C for 3 hours and followed by cooling in a reducing atmosphere. Thereafter the pile of 25 sheets underwent the second stage of sintering in a reducing atmosphere at a temperature of 1125°C for 3 hours whereupon the material was cooled in a reducing atmosphere.

The filtering material produced by this method had through pores and was capable of retaining particles sized 2.5 microns, exhibiting the following properties: filtering capacity 0.005 1/cm$^2$/min, tensile strength 12 kg/mm$^2$ (with a strip thickness of 0.18 mm), porosity 28 percent.

What is claimed is:

1. A method of making filtering metal material whereby powdered austenitic stainless steel ground into particles 10 to 30 microns is cold rolled to a strip form by being passed between mill rolls spaced 0.08 to 0.12 mm apart and rotating at a speed of 2 to 4 revolutions per minute, the strip material so produced undergoing a two-stage sintering process wherein the first stage of sintering is carried out in a reducing atmosphere at a temperature of 820° to 880°C for 2 to 3 hours and is followed by cooling down to 100°C in a reducing atmosphere and the second stage of sintering is carried out in a reducing atmosphere at a temperature of 1100° to 1150°C for 2 to 4 hours and is followed by cooling in a reducing atmosphere.

2. A filtering metal material consisting essentially of powdered austenitic stainless steel ground into particles 10 to 30 microns with interstitial spacing sufficient to retain particles of the size of 2–3 microns at elevated temperatures of up to 600°C, said material being cold rolled to a strip form by being passed between mill rolls and having a filtering capacity of 0.004–0.006 1/cm$^2$/min., a tensile strength of 11–13.5 kg/cm$^2$, a strip thickness of 0.15–0.18 mm., and a porosity ranging from 25–30 percent.

* * * * *